Patented May 16, 1950

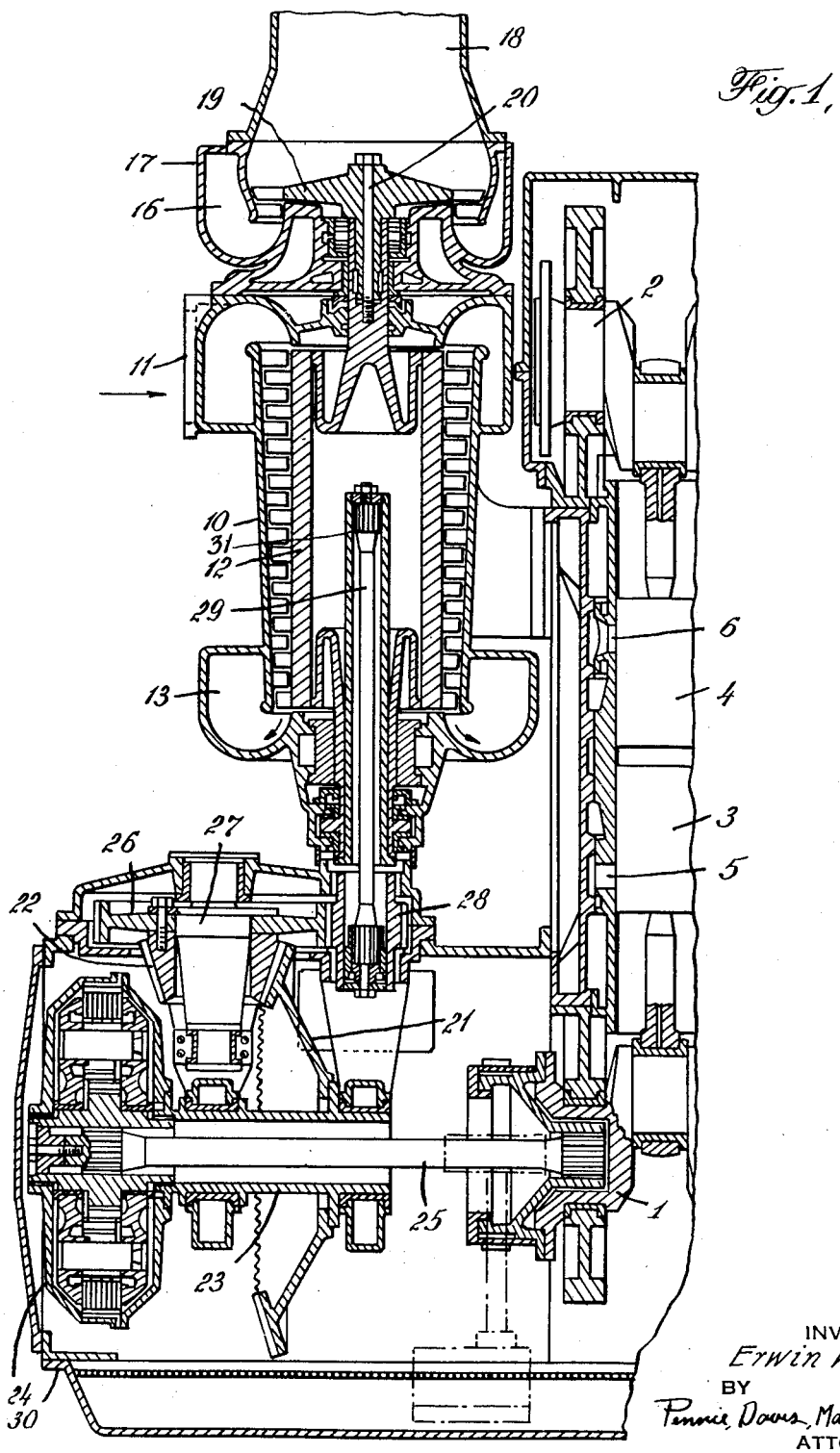

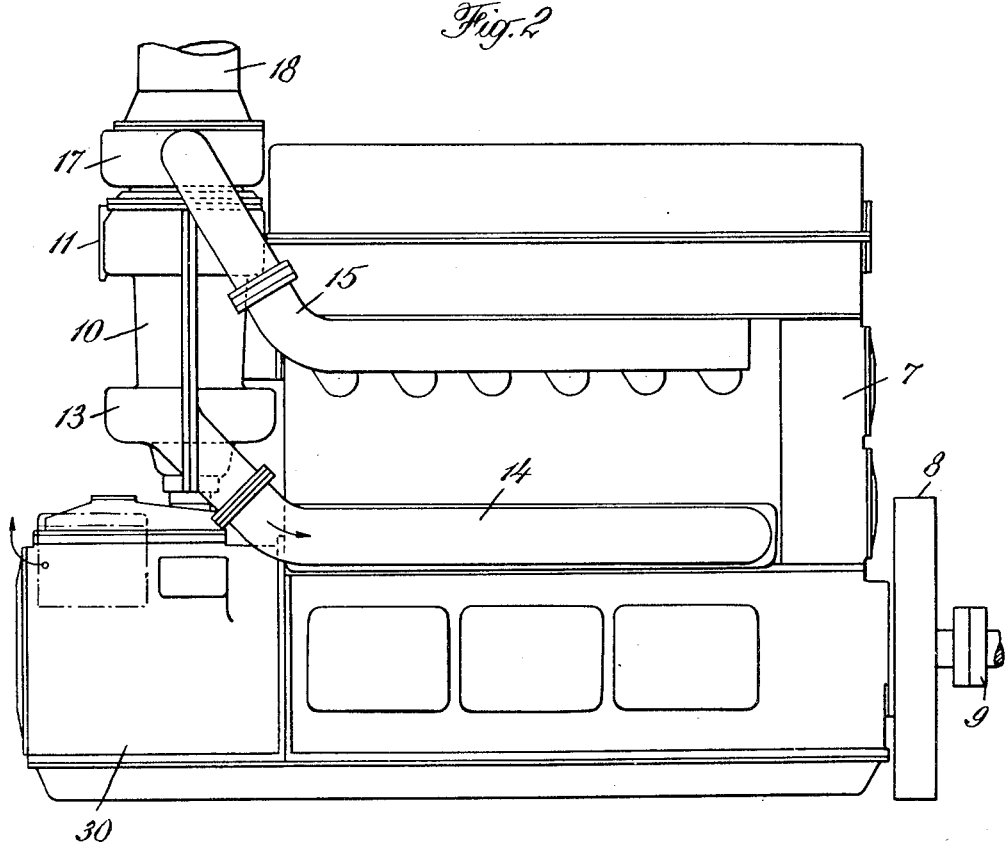

2,507,946

UNITED STATES PATENT OFFICE 2,507,946

INTERNAL - COMBUSTION POWER PLANT COMBINING TWO-SHAFT OPPOSED-PISTON ENGINE, AIR SUPPLY COMPRESSOR, AND EXHAUST-GAS TURBINE

Erwin Waeber, Winterthur, Switzerland, assignor to Sulzer Frères, Société Anonyme, Winterthur, Switzerland Application February 24, 1943, Serial No. 476,978
In Switzerland February 14, 1942

Section 1, Public Law 690, August 8, 1946
Patent expires February 14, 1962

3 Claims. (Cl. 60—13)

This invention relates to internal combustion power plants of the type including a reciprocating engine and an exhaust-gas-turbine-and-charging-compressor set arranged with its shaft parallel to the axis of the combustion cylinders of that engine. The power plant of the invention is characterized by a two-shaft opposed-piston reciprocating engine, a supercharging and scavenging air compressor constructed as an axial-flow compressor arranged at one end of that engine with its rotor axis parallel to the combustion cylinder axes, one end of that rotor being coupled, preferably through bevel gearing, to that crankshaft nearest the cylinder inlets, which is usually the crankshaft giving up power externally, and the other end of that rotor being coupled to the rotor of an exhaust-gas turbine driven by the reciprocating engine exhaust.

It is the object of the invention to provide the specific elements and arrangement of elements in the combination generally making up the type of power plant to which it relates which specially cooperate with one another to combine maximum efficiency with minimum space requirements.

The aim of the invention is accomplished not only by providing short exhaust-gas and charging air pipes between the engine and the turbo-compressor elements, but also by providing a uniform torque for the turbo-compressor set drive through the bevel gearing. To accomplish this latter, it is preferable to provide, between the bevel gearing and the crankshaft, a shaft which acts as a torsional spring. Additionally, within the rotor of the compressor, a shaft, acting as a bending bar spring as well, is arranged. In addition to that, a flexible coupling can also be adopted, and it may be positioned between the bevel gearing and the turbo set or between the bevel gearing and the crankshaft.

One embodiment of the invention is shown in the drawings, in which:

Fig. 1 is a vertical section through compressor, turbine, compressor drive and a part of an engine, assembled according to the invention; and Fig. 2 is a side view on a smaller scale showing the assembled relation of the parts illustrated in Fig. 1 to the engine as a whole.

The reciprocating engine has two crankshafts 1 and 2, which are driven by opposed pistons 3 and 4 respectively. The lower piston 3 controls inlet ports 5 and the upper piston 4, outlet ports 6. The crankshafts 1 and 2 are synchronized by means of gearing located in casing 7, and the power of shaft 2 is transmitted to shaft 1 through that gearing. The arrangement of toothed wheels 21, 22, 23 and 24 of Fig. 2 of U. S. Patent 2,372,676 is one form of gearing suitable for employment for this purpose. The total output of the internal combustion engine is delivered for use by shaft 1 through a flywheel 8 and a coupling 9.

The air required for scavenging and charging is drawn in through a branch duct 11 from the atmosphere by a vertical axial-flow compressor 10, arranged at one end of the reciprocating engine, and, after being compressed by the blading on the compressor rotor 12, is led into the working space of each cylinder through a collecting duct 13, an air manifold 14 and the several inlet ports 5. The exhaust-gases flow through outlet ports 6 and an exhaust manifold 15 into an annular passage 16 leading into an exhaust-gas turbine 17 and, after expanding there, pass through an exhaust-gas discharge pipe 18 to the atmosphere. The rotor 19 of the exhaust-gas turbine 17 is coupled by means of a shaft 20 to the rotor 12 of the compressor 10.

The crankshaft 1, which is nearer the inlet ports 5 and gives up power outside the engine, is mechanically coupled to the rotors 12 and 19 through bevel gearing 21, 22. The bevel gear 21 is mounted on a quill shaft 23, which is connected to the crankshaft 1 through a flexible coupling 24 and a shaft 25 which leads back from the coupling 24 through the quill shaft 23 and acts as a torsional spring. The bevel gear 22 is mounted directly on a spur gear 26 and is held, along with that gear, by the shaft 27.

The shafts 23 and 25 and the bevel gear 21 are supported in a casing 30 built as an extension to the reciprocating engine frame. The spur wheel 26 engages with a pinion 28 which is connected to a shaft 29. The shaft 29 is projected through and is connected to the inner end of a quill shaft 31. There is substantial radial clearance between shafts 29 and 31 from the outer end of the latter nearly to its inner end. This quill shaft 31 is connected at its outer end to the compressor rotor 12 and projects overhung into the hollow interior of this rotor so that the shafts 29 and 31 act with increased effect, but without requiring increased space, not only as torsion spring shafts, but also as bending spring shafts.

The described arrangement has the advantage that the shortest connection can be obtained between the compressor and the air inlet ports of the cylinder on the one hand, and between the outlet ports of the cylinder and the turbine on the other hand, thus avoiding not only piping taking up much room and liable to cause trouble by expansion, but also to a large extent resistance to flow. In addition, the arrangement makes it possible to lead the exhaust gases directly upwards and to bring the exhaust turbo-compressor set within the profile of the engine, thus saving a considerable amount of space which is of importance, particularly in marine plants.

Further simplicity is obtained with respect to thermal expansion, for it is easy, as shown, within the axial-flow rotor to arrange a flexible shaft between the bevel gearing and the turbo-set, which allows the cylinder block to expand independently of the position of the gearing. Also with respect to power oscillations, a considerable improvement is effected in an engine arranged according to the invention.

The axial-flow compressor is, of course, especially suitable for a high level supercharging compressor, and produces an increased cylinder charging pressure. Beyond a certain charging pressure excess power is supplied, at least at full load, by the exhaust-gas turbine through the compressor and the bevel gearing to the shaft giving up power to the outside. The invention is particularly suitable for adoption in two-stroke engines. It also offers, however, advantages in the case of four-stroke engines.

I claim:

1. An internal combustion power plant including, in combination, a reciprocating engine of the two-shaft opposed-piston type having intake and exhaust ports at opposite ends of the swept space of its combustion cylinders, a turbo compressor set arranged closely adjacent said engine with its shaft parallel to the axis of said combustion cylinders, said set including a rotary air compressor of the axial-flow type having its air discharge at one end of said set, and an exhaust gas turbine coupled to said compressor located at the opposite end of said set from said air discharge, said set being coupled at the compressor end thereof to one shaft of said engine and arranged with said compressor end corresponding to said intake ports and the turbine end corresponding to said exhaust ports, and short piping connecting said intake ports to said air discharge and said exhaust ports to said turbine.

2. The power plant of claim 1 including a first bevel gear journalled on an axis parallel to the engine crank shafts, a first torsionally elastic element coupling said first bevel gear to one of said shafts, a second bevel gear in mesh with said first bevel gear journalled on an axis parallel to the turbo compressor set, and a second torsionally elastic element coupling said second bevel gear to said set.

3. The power plant of claim 2 including an extension to the frame of the reciprocating engine extending beneath the turbo compressor set and supporting the journals of the bevel gears, a hollow rotor in the compressor of said set, a quill shaft coupled to said rotor at one end thereof and having its other end located within said rotor, and a torsionally elastic shaft coupled to the second bevel gear and extending up from said extension and connected at its top to the end of said quill shaft within said rotor, there being a substantial radial clearance between the outside of said torsionally elastic shaft and the inside of said quill shaft.

ERWIN WAEBER.

REFERENCES CITED

The following references are of record in the file of this patent:

UNITED STATES PATENTS

| Number | Name | Date |
|---|---|---|
| 902,996 | Parsons | Nov. 3, 1908 |
| 1,662,597 | Baldwin et al. | Mar. 13, 1928 |
| 1,680,017 | Fornaca | Aug. 7, 1928 |
| 1,738,251 | Kasley | Dec. 3, 1929 |
| 1,774,116 | Wach | Aug. 26, 1930 |
| 1,859,007 | Short et al. | May 17, 1932 |
| 2,159,422 | Büchi | May 23, 1939 |
| 2,176,021 | Grutzner | Oct. 10, 1939 |
| 2,278,181 | Lieberherr | Mar. 31, 1942 |
| 2,281,821 | Balmer | May 5, 1942 |
| 2,359,045 | Markwalder | Sept. 26, 1944 |
| 2,359,065 | Waeber | Sept. 26, 1944 |
| 2,372,676 | Kilchenmann | Apr. 3, 1945 |

FOREIGN PATENTS

| Number | Country | Date |
|---|---|---|
| 270,738 | Great Britain | Nov. 10, 1927 |
| 347,872 | Great Britain | May 7, 1931 |
| 385,748 | Great Britain | Jan. 5, 1933 |

OTHER REFERENCES

Power and Works Engineer, issue of August 1942, page 211.